Dec. 21, 1954  R. B. KERR ET AL  2,697,648
TIMING SYSTEM FOR RECORDERS
Filed Aug. 11, 1949  2 Sheets-Sheet 1

ROBERT B. KERR
RAYMOND K. ROBERTS
INVENTORS

BY D. Carl Richards

AGENT

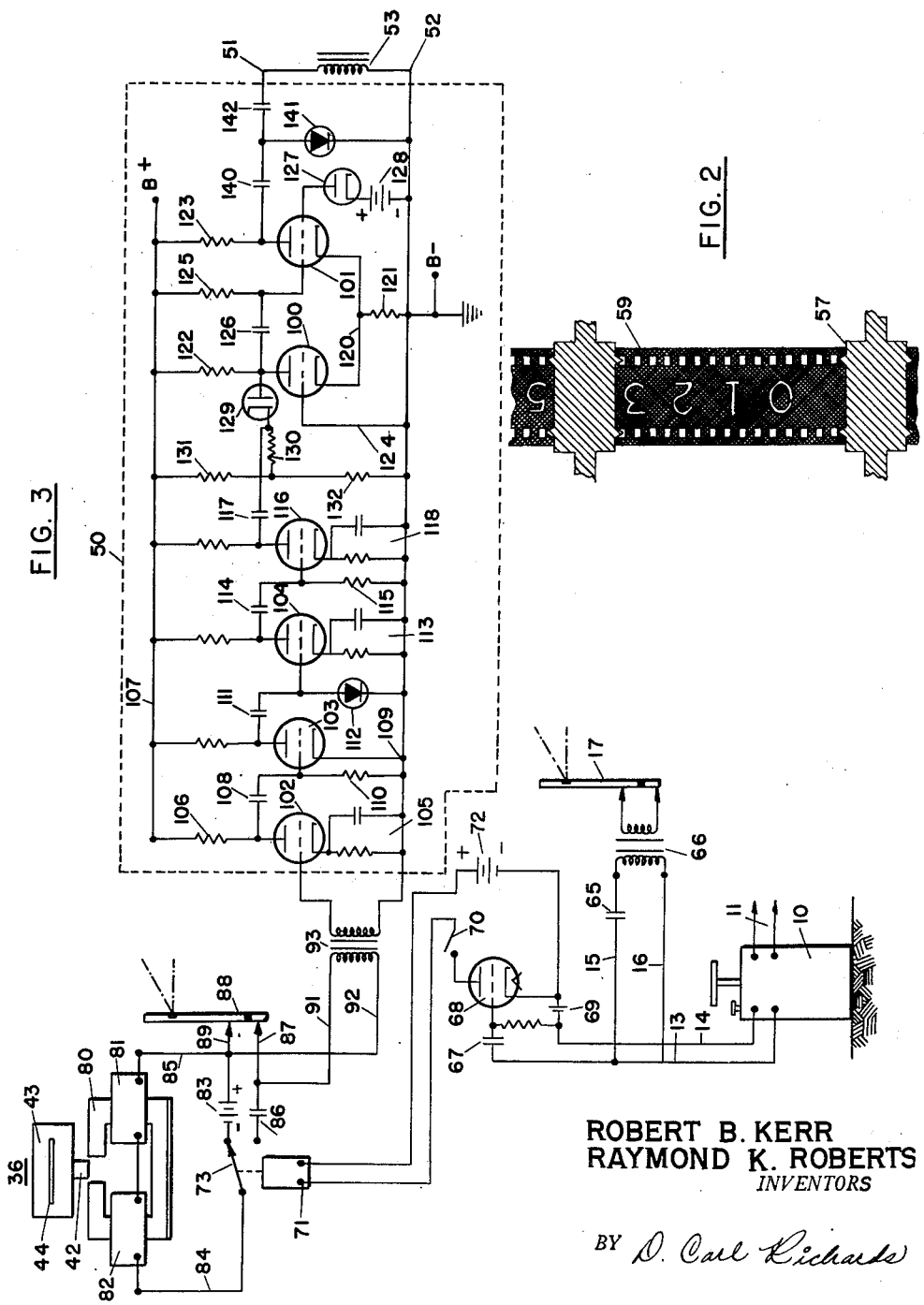

United States Patent Office 2,697,648
Patented Dec. 21, 1954

2,697,648

TIMING SYSTEM FOR RECORDERS

Robert B. Kerr and Raymond K. Roberts, Dallas, Tex., assignors, by mesne assignments, to Socony-Vacuum Oil Company, Incorporated, New York, N. Y., a corporation of New York Application August 11, 1949, Serial No. 109,712

7 Claims. (Cl. 346—33)

This invention relates generally to timing of seismic waves recorded on a moving photographic film. More particularly, the invention is directed to a system for applying a time scale to the film in a predetermined time relation and in response to the initiation of seismic waves.

This invention is particularly useful in systems of sub-surface surveying where seismograph apparatus is utilized to produce seismograms which show the period of elapsed time required for seismic waves to travel from the point of their origin to a substratum where they are reflected or refracted to a surface detector. It is customary to provide some means for impressing timing lines on the record at selected intervals, i. e., at .01 second intervals. Ordinarily, the timing system is wholly independent of the initiation and arrival of the seismic waves to be recorded. Stated otherwise, the time break which marks the initiation of seismic waves is recorded in a random fashion and generally is not synchronized with the timing lines. Consequently, it is necessary for a computer to make a zero correction on each record produced which in general differs from record to record. The zero correction, i. e., the interval between the time break and an adjacent timing line, must be added to or subtracted from each time interval taken from the seismic record. A great number of such time-consuming calculations is involved in reducing the seismic data to useful and practical information.

It is an object of this invention to simplify and eliminate, in so far as is possible, the necessity of any intermediate time-consuming computing steps by providing an improved system for impressing a time scale on each record produced, which time scale is impressed in predetermined relation with respect to the seismic waves.

In accordance with the present invention, a seismic record is produced independent of control of personnel other than the observer. More particularly, the present invention includes generating seismic waves in the earth and recording subsequently detected seismic waves on a moving photographic film at a first recording point along the path of the film. A time scale is provided for the seismic record by producing timing markers at a predetermined time interval after and in response to the generation of the seismic waves and recording on the film the timing markers at a second point along the path of the film displaced from the first recording point by an amount in terms of travel-time of the film equal to the predetermined time interval. A record thus produced is characterized by having a numbered time scale recorded in a predetermined time relation with respect to the recorded seismic waves.

For a further understanding of the invention, reference may now be had to the following description taken in conjunction with the accompanying drawings in which:

Fig. 2 is a sectional view taken along line 2—2 of Fig. 1; and

Fig. 3 is a circuit diagram of the electrical system of Fig. 1.

Figure 1:
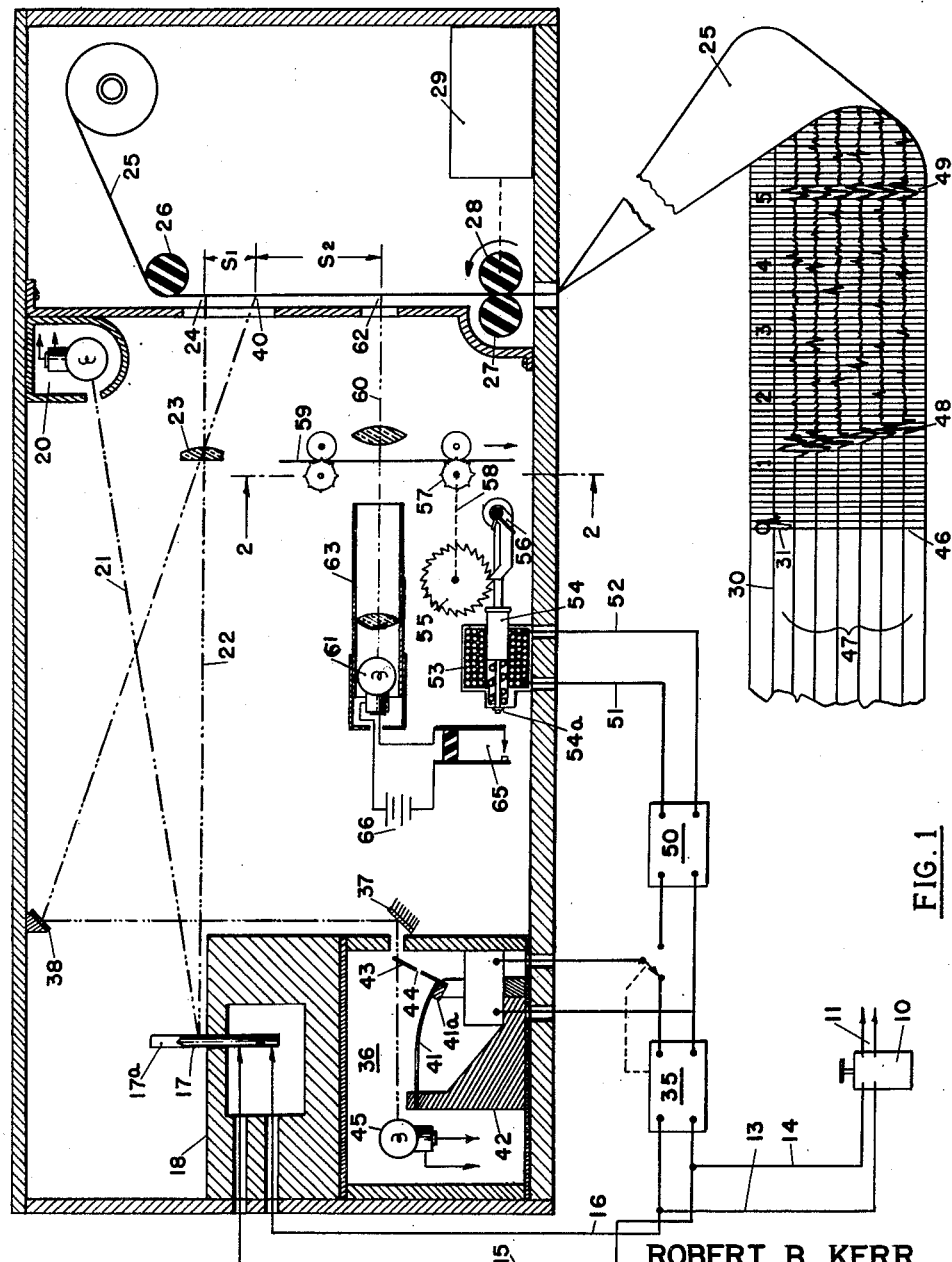
Fig. 1 is a schematic view partially in section of an oscillographic recording system.

Referring now to Fig. 1, a system is illustrated for impressing timing markers on a seismic record synchronized with the generation of the seismic waves and recorded in predetermined space relation on the record of the seismic event. The timing markers consist of a series of uniformly spaced transverse timing lines, the first of which is recorded on the seismic record at a point which corresponds to the shot instant or the instant of generation of the seismic waves. As is customary, a blasting machine 10 may be utilized to generate a voltage for energizing a blasting cap (not shown) which is connected in the circuit including conductors 11. When the blasting cap is fired for generation of seismic waves by detonation of an explosive charge associated therewith, a voltage pulse or signal simultaneously generated is transmitted from blaster 10 located at or near a shot point to suitable seismic wave recording apparatus. In Fig. 1, the pulse is transmitted by way of conductors 13 and 14 to the recording camera. The time break impulse is there applied by way of conductors 15 and 16 to the terminals of a conventional seismograph galvanometer 17 mounted in a galvanometer block 18.

The galvanometer includes a rotatable coil suspension which carries a mirror and is utilized to record the time break impulse. More particularly, light from a source 20 following a path 21 strikes the mirror in galvanometer 17 and is reflected along path 22 through a condensing lens 23 to a first recording point 24. A photographic film or sensitized paper 25 fed over a roller or guide 26 is driven past the first recording point 24. The film 25 extends between an idler 27 and a driving roller 28 which is mechanically coupled to a constant speed motor 29. For simplicity, and for the purpose of furthering an understanding of the present invention, the film 25 has been extended from the camera and shown as a developed record on which light from galvanometer 17 appears as a fine line or galvanometer trace 30.

The time break voltage applied to galvanometer 17 displaces the beam of light directed thereto to produce a time break pulse 31 on the seismic record. Simultaneously therewith, and in accordance with the present invention, the time break voltage pulse is applied to a control circuit 35 which actuates a timing reed device 36 for the production of transverse timing lines on the seismic record or film 25. Light from the timing device 36 is reflected from mirror 37 to mirror 38 and thence through condensing lens 23 to a second recording point 40. The timing lines are produced in unit 36 by means of a vibrating reed 41 having a fixed end secured to a base 42. The free end of the reed 41 has an armature 41a attached thereto as well as a light interrupting mask or shutter 43. An elongated slot 44 is provided in shutter 43 for interruption of a light beam from a suitable source such as the lamp 45. The first flash of light from source 45 reaching film 25 following reception of the time break impulse by control circuit 35 is recorded at precisely the same record time as the time break itself.

More particularly, the time break 31 and the first timing line 46 of a series of timing lines are impressed or photographed concurrently with or are actually superimposed one on the other. The concurrent recording of impulses or signals generated at different times is accomplished by recording the timing lines at a second recording point 40 spaced a time-distance $S_1$ along the travel path of film 25 from the recording point 24 where the time break is recorded. The time-distance $S_1$ is proportional to the velocity of film 25 and to the time interval between the generation of the seismic waves and the production of the first timing line by passage of the first flash of light through the slot 44. In terms of travel time of film 25, the time-distance $S_1$ is equal to the time interval between generation of the seismic waves and the production of the first timing line. Ordinarily the film 25 is driven at constant velocity. When such is the case, the distance $S_1$ is equal to the film velocity divided by the time interval between generation of the seismic waves and the production of the first timing line. Light from the source 20 is reflected from a plurality of galvanometers 17a which, in addition to the time break galvanometer 17, are carried by magnet 18. Light from the galvanometers 17a is recorded on film 25 as a plurality of traces at the same point the time break 31 is recorded, i. e., recording point 24.

Seismic signals detected by a plurality of geophones are amplified and impressed on galvanometers 17a and are recorded as variations in amplitude of the traces 47 on the film 25. A typical seismic event is illustrated in Fig. 1 and is characterized by first arrival impulses 48, followed by reflection impulses 49. In seismic exploration, the lapse of time between the generation of the seismic waves (time break 31) and the arrival of reflected energy (reflection 49) is utilized to calculate the depth of a reflecting bed. The provision of a scale synchronized to begin on each record precisely at the zero record time simplifies the task of reducing the seismic data to useful information.

In addition to recording the first timing line at zero record time, a voltage generated in synchronism with the vibration of the light-interrupting reed 41 and having the same frequency as the vibration is utilized photographically to record or otherwise impress a second series of timing markers on the record, which may consist of a number scale whose zero coincides with the first timing line and the ascending numerals coincide with other selected timing lines at uniformly spaced intervals. The number scale is produced by applying a voltage generated upon vibration of reed 41, as will hereafter be further described, to a frequency-dividing circuit 50. Output pulses from circuit 50 at a selected submultiple of the frequency of the reed 41 are applied to a timing line numbering device. More particularly, a pulse applied by way of conductors 51 and 52 to a solenoid coil 53 causes the spring-biased armature 54 to be retracted. A ratchet wheel 55 in operative engagement with a spring biased latch 56 carried by armature 54 is rotated through a predetermined angle for every pulse from circuit 50. The ratchet 55 drives a sprocket wheel 57 through a coupling or shaft 58 (shown dotted).

A film positive 59 (best seen in Fig. 2), having transparent numbers beginning at zero (0) and numbered upward consecutively, is positioned in the beam of light 60. Beam 60 is projected from source 61 through film 59 and onto the moving recording paper 25 at a third recording point 62. Where, in accordance with conventional practice, the timing lines are .01 second apart, the solenoid 53 is energized to advance the film positive 59 ten frames per second to number every tenth timing line. Each time the armature 54 is retracted, a next succeeding number is pulled down and centered on the axis of the projector 63. At the end of each stroke of the armature 54, the elongated end 54a of armature 54 actuates switch 65 completing the circuit to the lamp 61 for momentary flow of current from a suitable source generically illustrated by battery 66. A beam of light from bulb 61 flashes momentarily through film 59 and exposes a number near the upper edge of film 25. The distance $S_2$ is adjusted for exposure of the zero (0) on the first timing line with ascending numbers preferably on every tenth timing line thereafter as illustrated in Fig. 1. The film 59 may conveniently comprise 60 to 100 frames in order to number relatively long refraction seismograph records as well as the shorter reflection records.

It will be observed that the record produced with the system of Fig. 1 is free from timing lines until the instant of detonation of the explosive charge. The time break and the first timing line are recorded at the same point, with the first and every tenth timing line thereafter numbered. The time break, the timing lines, and the numbers are both mechanically and electrically synchronized as will further be explained in connection with Fig. 3.

The electrical system for synchronized recording of time break, timing lines and numbers is illustrated in Fig. 3, where like parts have been given the same reference characters as in Fig. 1. The time break impulse is transmitted from blaster 10 to galvanometer 17 by way of a circuit including conductors 13 and 15, condenser 65, transformer 66 and conductors 16 and 14. The galvanometer 17 is included in the secondary circuit of transformer 66. The time break impulse is also applied through condenser 67 to the grid of a thyratron 68 which normally is non-conductive due to the negative bias battery 69 in its grid-cathode circuit. The plate-cathode circuit of tube 68 includes a resetting switch 70, relay coil 71, and a source of plate potential 72. Application of the time break impulse to thyratron 68 raises the grid potential to initiate conduction. Thereupon, plate current flowing through relay coil 71 actuates switch 73 which controls the action of the timing reed device 36.

A timing unit of the type illustrated by the reed device 36 is described and illustrated in detail in Patent 2,424,622 to C. D. McClure, a co-worker of the present applicants.

Briefly, however, the reed armature 42 is positioned adjacent the juxtaposed arms of a C-shaped magnet core 80. Coils 81 and 82 are wound on the arms of the core 80. When switch 73 is in the position illustrated in Fig. 3, current flows through coils 81 and 82 from a battery or other suitable source of potential 83, the circuit including conductors 84 and 85. As a result, a strong magnetic flux is concentrated in the air gap between the ends of the core 80. Armature 42, made of magnetic material, is attracted by the magnetic flux and is moved downwardly, as viewed in Fig. 1, into the air gap and held there as long as current flows in coils 81 and 82. When coil 71 is energized to actuate switch 73, the armature 42 is released and the reed 41 (Fig. 1) vibrates freely interrupting light from the bulb 45 for the period in which seismic waves are recorded.

Actuation of switch 73 opening the circuit including battery 83 also closes a circuit which includes condenser 86, conductor 87, galvanometer 88 and conductor 89. As disclosed in the McClure patent, a sine wave voltage is generated in coils 81 and 82 by the vibration of armature 42 in the air gap of core 80 and, in accordance with the above patent may be applied to galvanometer 88 for the production of distinctive markings (omitted from Fig. 1) on every other timing line.

The sine voltage from coils 81 and 82 is utilized for synchronized numbering of selected timing lines. More particularly, the voltage is applied by way of conductors 91 and 92 to an input transformer 93 of a frequency reducing circuit 50 whose output energizes the coil 53, Fig. 1. Assuming that the reed 41 vibrates at 50 cycles per second and that every tenth timing line is to be numbered, the circuit 50 is designed to produce 10 voltage pulses per second from a 50 cycle sine wave input voltage.

Although other circuits may be used for producing the desired output pulses, a suitable circuit is illustrated in Fig. 3 and includes a monostable multivibrator comprised of tubes 100 and 101. Such multivibrator circuits are described in the text Wave Forms by Chance et al., volume 19 of M. I. T. Radiation Laboratory Series, McGraw-Hill, page 573. As there described, negative voltage pulses applied to the anode of tube 100 causes current pulses of reduced frequency to flow in the anode circuit of tube 101, the ratio of the input and output frequencies being determined by the time constant of the anode circuit of tube 100. In the system of Fig. 3, tubes 102, 103, 104, and 116 convert the 50 cycle sine wave voltage from timing device 36 into the requisite 50 cycle negative pulses for exciting the frequency reducing multivibrator.

The cathodes of tubes 102, 103, 104, and 116 are connected to a negative voltage source B— through cathode biasing circuits 105, 113, and 118 respectively, whose constants are chosen to bias the tubes for class A amplification. The anodes of tubes 102, 103, 104, and 116 are connected to a source of positive potential (B+) through plate load resistors 106. Tube 102 is normally biased by the cathode circuit 105 for amplification of the input signal applied thereto through transformer 93 in its grid cathode circuit. The amplified signal is coupled to the grid of tube 103 by way of condenser 108. Tube 103, with its cathode coupled directly to B—, operates at zero grid bias and serves to clip the peaks of positive pulses of the sine wave signal to produce rectangular output pulses. More particularly, on the negative half-cycle, the grid of tube 103 is driven to cutoff. On the positive half-cycles, current pulses flow in the plate circuit. Additionally, when positive, the grid draws current which flows through resistor 110 limiting the peak of the anode current at a fixed value and thus producing rectangular plate current pulses.

The combination of condenser 111 and rectifier 112 couples the anode of tube 103 to the grid of tube 104, differentiates the pulses, and additionally by-passes the positive voltage peaks, produced upon differentiation, to ground. Negative peaks only are effective to vary the grid-cathode potential of tube 104 which is otherwise fixed by the bias network 113. Positive pulses are thereby produced at the plate of tube 104 and are applied through condenser 114 to the grid circuit of tube 116 which includes grid resistor 115. Tube 116 is biased by the cathode circuit 118 for amplification of the positive pulse applied to its control grid. The negative pulse thus produced in the plate circuit of tube 116 is coupled by way of condenser 117 to the input of a monostable multivibrator.

In the multivibrator circuit, the cathodes of tubes 100 and 101 are connected together by conductor 120 and to ground through a common cathode resistor 121. The plate of tube 100 is connected to the B+ bus 107 through resistor 122. Similarly, the plate of tube 101 is connected to B+ through resistor 123. The grid of tube 100 is connected directly to ground by conductor 124 while the grid of tube 101 is connected to B+ through the resistor 125, to the plate of tube 100 through condenser 126, and additionally through diode 127 and battery 128 to ground. The plate of tube 100 is connected through diode 129 and resistor 130 to the midtap of a voltage divider including resistors 131 and 132 connected between B+ and ground. The negative input or trigger pulses are applied to the multivibrator at the cathode of the rectifier 129.

In the stable state of the multivibrator, tube 101 is conducting and tube 100 is biased off by flow of current through the resistor 121. A negative pulse applied to the plate of tube 100 through diode 129 triggers the circuit to its unstable condition; i. e., tube 101 off and tube 100 conducting. During this period, diodes 129 and 127 are non-conducting and therefore trigger pulses are isolated from the multivibrator. While tube 100 conducts, condenser 126 charges through resistor 122 until the potential of the grid of tube 101 rises to the critical potential at which the tube 101 again begins to conduct. A regenerative action then restores the multivibrator to its stable state; i. e., tube 101 conducting and tube 100 biased off. The first trigger pulse applied after stability is restored switches the circuit back to its unstable condition. Thus, intermittent pulses of current flow in the anode circuit of tube 101. The square wave output pulses from tube 101 are differentiated by the condenser 140 rectifier 141 circuit. Positive pulses are by-passed to ground through rectifier 141 and the negative pulses coupled to the solenoid coil 53 by way of condenser 142.

The period required for the multivibrator to return to its stable condition following a first trigger pulse may be varied by the initial charge on condenser 126, the magnitude of the current flowing in tube 100 during the unstable period, or the cutoff potential of tube 101. For 50 cycle pulses applied through condenser 114, the multivibrator will preferably be adjusted in either of the above factors or a combination thereof to trigger the multivibrator with every fifth pulse to apply to coil 53 ten pulses per second.

In the system above described, the timing apparatus is dormant until reception of the time break impulse. As the moving photographic film passes the first recording point, the time break is recorded. As the film travels past the first recording point toward a second recording point, the timing device 36 responsive to the time break impulse initiates production of timing lines, the first of which is recorded at the second recording point and is superimposed upon the time break impulse. At the same time, generation of a control voltage is initiated. The voltage is applied through the pulse circuit 50 to the solenoid coil 53 to number, at a third recording point, selected ones of the timing lines, with a zero being recorded or superimposed upon the first timing line.

Although a particular modification of the invention has been illustrated and described in detail, other modifications may now appear to those skilled in the art. For example, the numbering mechanism may comprise a rotating disk suitably marked or numbered at its periphery and driven by a motor in synchronism with the voltage generated in the reed device 36 to mark or number selected timing lines in place of the solenoid operated numbering mechanism. Further, it will be noted that once the system has been properly adjusted, the need for trace 30 and time break 31 is eliminated, since the first timing line 46 is recorded in a fixed relation with respect to the seismic event and occurs precisely at the zero record time. However, the presence of the time break 31 on the seismic record serves a useful function in that it provides the seismic operator with an accurate check upon the operation of his recording apparatus and is therefore most desirable. Other such modifications may now be made, all within the scope of the appended claims.

What is claimed is:

1. In seismic prospecting where seismic waves and a time break impulse simultaneously are generated coincident with detonation of an explosive charge and applied to a recording system including means for recording said seismic waves at a first recording point along the path of a photographic film and an initially restrained reed blocking a beam of light, the combination of means responsive to said time break impulse for releasing said reed for periodic passage of said beam of light, and means for projecting said beam of light to a second recording point displaced from said first recording point by an amount in terms of travel-time of said film equal to the time interval between said time break impulse and the first passage of light.

2. In seismic prospecting where seismic waves and a time break impulse simultaneously are generated upon detonation of an explosive charge and signals from seismic detectors corresponding to said seismic waves are recorded by a recording system which includes an initially restrained reed blocking a beam of light, the combination of a series of galvanometers for respectively recording at a first position on said film said signals from said detectors spaced one from the other, means responsive to said time break impulse for releasing said reed to initiate production of timing markers, and means for projecting said timing markers to a second recording position spaced from said first position by an amount in terms of traveltime of said film equal to the time interval between the generation of said seismic waves and the production of the first timing marker.

3. A seismic prospecting system in which a galvanometer is utilized to record a time break signal on a moving photographic film, comprising a light interrupter, a switch for controlling operation of said interrupter, a thyratron, a circuit for applying said time break impulse to said thyratron and to said galvanometer, a solenoid in the anode circuit of said thyratron for controlling operation of said switch to initiate operation of said interrupter, and an optical system for directing light from said interrupter to said film for production of the first timing line at the same point on said film at which said time break signal is recorded.

4. In seismic prospecting where seismic waves are generated by detonation of an explosive charge and subsequently detected and recorded at a first point on a photographic film driven at a constant velocity past said point, the recording on said film of said seismic waves providing by their position on said film a time-position relationship corresponding with the time-occurrence of the initiation of generation of said waves, the combination of a light-interrupter, a gas tube, solenoids in circuit with said gas tube for initiating operation of said light-interrupter, said interrupter a time interval after the initiation of operation thereof producing timing lines equally spaced one from the other, said solenoid means being actuated by flow of current therethrough, means for energizing said tube in predetermined time relation with respect to the instant of the generation of said seismic waves to initiate said flow of current through said solenoid means for initiation of operation of said light-interrupter, and an optical system having elements for directing light from said interrupter onto said film at a recording point spaced along the path of said film in advance of said first point a distance which corrects for the delay of said interrupter in producing said timing lines for exposing at a point on said film the first of said timing lines in time-position on the film coincident with the instant of generation of said seismic waves.

5. In a seismic recording system having means for recording seismic waves on light-sensitive recording film as it passes a first recording point, and timing means for producing a series of transverse timing lines on said film and for generating a voltage having a frequency related to the rate of production of said timing lines, the combination of means responsive to a time break impulse produced upon generation of seismic waves for initiating operation of said timing means, said timing-line producing means being characterized by a positional line-recording relationship with respect to said recording point for applying the timing lines to the seismogram displaced from said recording point to record the first timing line on the film at a zero position coinciding with the generation of said seismic waves, and means responsive to said voltage generated by said timing means for applying to said film a numbered scale whose zero coincides with the first of said timing lines and ascending numerals with selected ones of succeeding timing lines.

6. In a seismic recording system having means for recording seismic waves on a moving photographic film as it passes a first recording point and timing means for producing a series of timing markers on said film, the combination of means operative upon generation of said seismic waves for initiating operation of said timing means, which timing means after a predetermined time interval produces one of said timing lines and thereafter produces additional timing lines in spaced relation with each other and additionally generates a signal at a rate equal to the rate of production of said timing lines, means for producing from said signal a second signal at a rate equal to a predetermined submultiple of said first signal, means for recording said timing lines at a second recording point in predetermined spaced relation from said first recording point, and means responsive to said second signal for recording numerals on selected ones of said timing lines at a third recording point spaced a predetermined distance from said first recording point.

7. In seismic prospecting where seismic waves and a time break impulse simultaneously are generated upon detonation of an explosive charge and signals from seismic detectors corresponding to said seismic waves are impressed on a recording system which includes means for impressing timing lines on said record the combination which comprises means for driving said record past a first recording point at a substantially constant velocity, a series of galvanometers for impressing on said record as it passes first recording point signals from said detectors, means responsive to said time break impulse for initiating production of said timing lines, and means for impressing said timing lines on said record as it passes a second recording point spaced from said first recording point by an amount in terms of travel time of said record equal to the time interval between generation of said time break impulse and the production of the first timing marker.

References Cited in the file of this patent

UNITED STATES PATENTS

| Number | Name | Date |
|---|---|---|
| 2,184,953 | Bryan | Dec. 26, 1939 |
| 2,313,091 | Renner | Mar. 9, 1943 |
| 2,375,433 | Minton | May 8, 1945 |
| 2,424,622 | McClure | July 29, 1947 |
| 2,490,461 | McKinney | Dec. 6, 1949 |
| 2,496,392 | Hasbrook | Feb. 7, 1950 |